(No Model.) 2 Sheets—Sheet 1.
G. J. F. TATE.
CANISTER.
No. 345,554. Patented July 13, 1886.
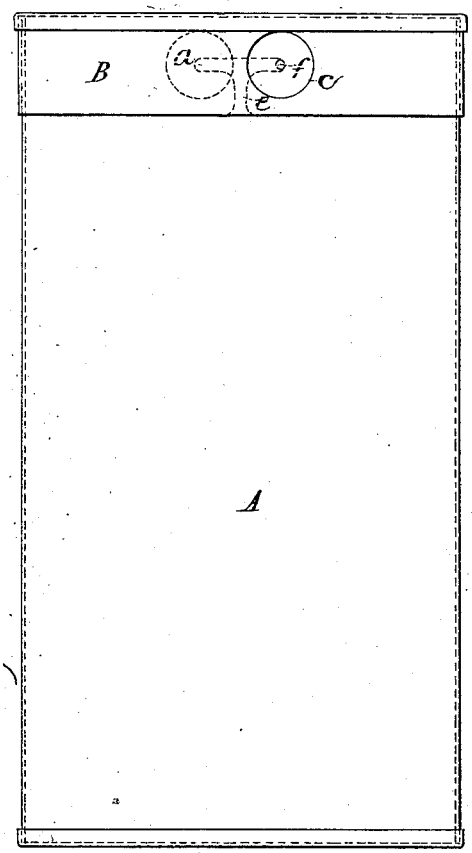
Fig. 3
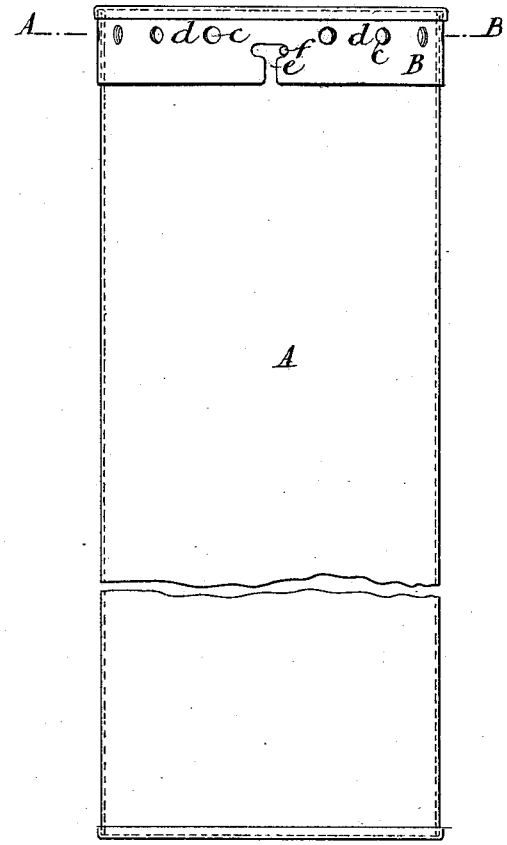
Fig. 1
Fig. 11
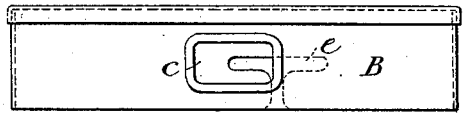
Fig. 10
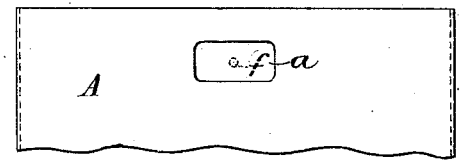
Fig. 2
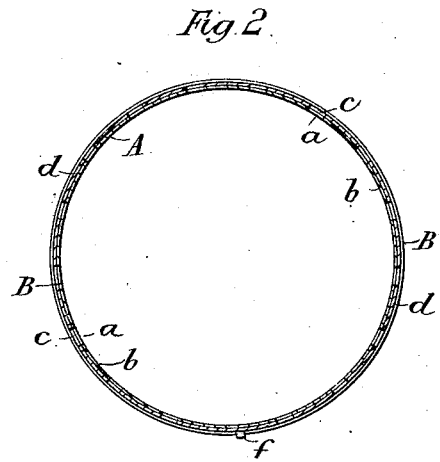
Witnesses.
Will F. Norton
R. B. Washington
Inventor.
George James Frederick Tate.
By John J. Halsted & Son
his Attys (No Model.) 2 Sheets—Sheet 2.

G. J. F. TATE.
CANISTER.

No. 345,554. Patented July 13, 1886.

Witnesses.
Will T. Norton
R. B. Washington

Inventor:
George James Frederick Tate,
By John J. Halsted & Son
his Att'ys

UNITED STATES PATENT OFFICE.

GEORGE J. F. TATE, OF LONDON, ENGLAND.

CANISTER.

SPECIFICATION forming part of Letters Patent No. 345,554, dated July 13, 1886.

Application filed March 24, 1886. Serial No. 196,428. (No model.)

*To all whom it may concern:*

Be it known that I, GEORGE JAMES FREDERICK TATE, a subject of the Queen of Great Britain, residing at London, England, have invented a new or Improved Canister or Box for Containing and Distributing Powdered or Granulated Material, Seeds, and the like, of which the following is a specification.

My invention has for its object to provide, in a simple and inexpensive form, a box or canister which shall serve the double purpose of packing and storing powdered or granulated material, seed, or the like, and of dusting or distributing the same into any receptacle or upon any matters or places, as may be required.

To effect these objects my invention consists in a special construction of the rim of the canister-cover with reference to the top of the box, and a corresponding construction of the top of the box, all as more particularly hereinafter stated.

The mode of carrying out my invention is as follows: I perforate or make a hole or a series of holes either partially or wholly round the canister, near the top edge thereof, the holes, when more than one are employed, being placed at equal distances apart. I then make a similar and corresponding number of holes in the rim of the cover. I further cut a T-shaped slot or recess from the bottom of the rim of the cover, and I place a pin or stop in the side of the canister, near the top.

Figure 6:
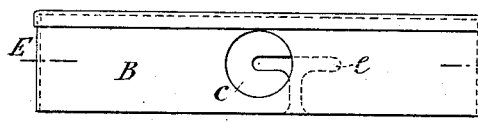
Figure 7:
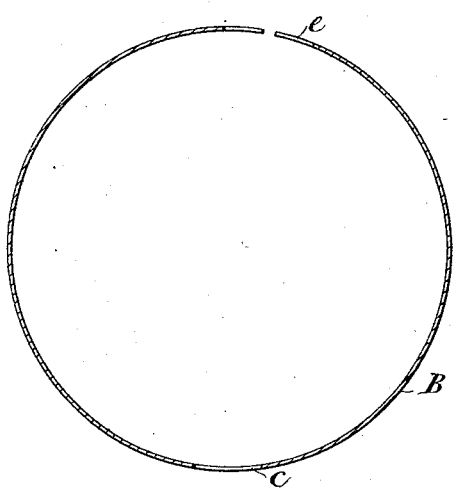
Figure 9:
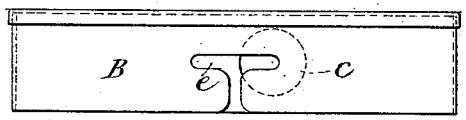
Figure 8:
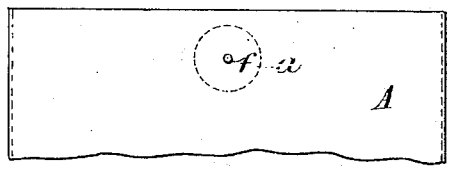
Figure 4:
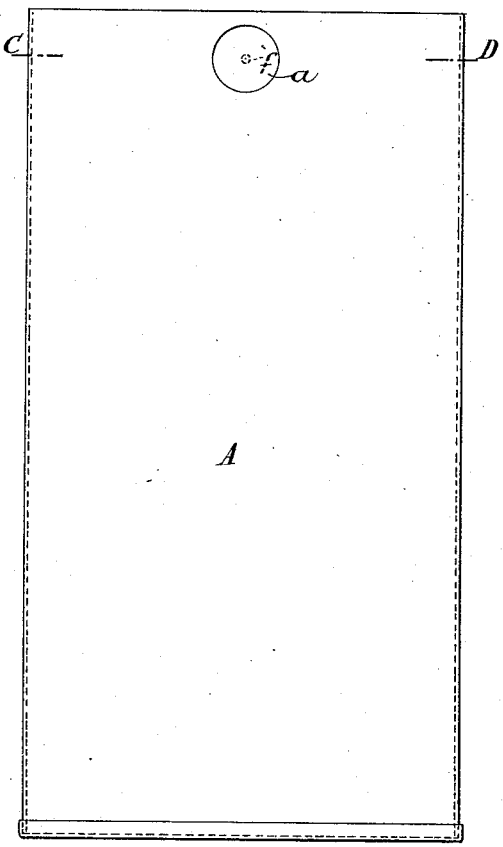
Figure 5:
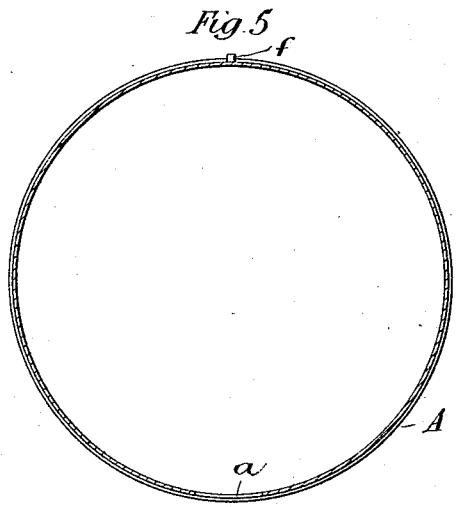

In the accompanying drawings, Figure 1 represents an elevation of a canister or box constructed according to my invention and suitable for containing and distributing powdered or granulated material—such, for example, as that used for deodorizing and disinfecting purposes. Fig. 2 is a horizontal section of the same, on line A B of Fig. 1. Fig. 3 is an elevation of a canister or box suitable for containing coffee, seeds, or other similar substances, and for withdrawing a supply of or distributing the same therefrom. Fig. 4 is an elevation of the canister or box shown in Fig. 3, with the cover removed. Fig. 5 is a horizontal section on line C D of Fig. 4. Fig. 6 is an elevation of the cover. Fig. 7 is a horizontal section on line E F of Fig. 6. Figs. 8 and 9 are an elevation of the upper part of the box or canister with the cover removed and an elevation of the cover, respectively, these views being diametrically opposite to those shown at Figs. 4 and 6. Fig. 10 is an elevation of the upper part of a canister or box with the cover (which is shown in elevation at Fig. 11) removed, the said views showing a rectangular-shaped hole instead of a circular hole, as in the other figures.

Similar letters in all the figures represent similar parts.

*a a* represent the holes or perforations which I make in the body A of the canister or box near the top edge thereof, a series of such holes *a* being provided, as shown in Figs. 1 and 2, when the canister is intended for such purposes as for containing and distributing material for deodorizing and disinfecting purposes. When, however, the canister is intended to contain coffee, seeds, or the like, only one of such holes *a* is necessary, as shown in Figs. 3, 4, 5, 8, and 10.

*b b* are the intervening portions between the holes *a* when a series of holes is employed, as in Figs. 1 and 2.

*c c* are the holes in the rim of the cover B of the canister corresponding in number and shape with the holes *a* in the body A.

*d d* are the intervening portions between the holes *c*.

*e* is the T-shaped slot or recess in the rim of the cover of the canister, and *f* is the pin or stop in the side A of the canister, near the top, engaging in the T-shaped slot or recess *e*.

The holes *a* and *c* may be of any convenient shape—such as circular, as shown in Figs. 1, 3, 4, 6, 8, and 9, or oblong or rectangular, as shown in Figs. 10 and 11.

The mode of using my improved canister is as follows: When the powder or other material is simply to be stored in the canister, the cover B is put into its place with the parts *d* of the cover opposite the holes *a* in the body A of the canister, and when the material is to be shaken or dusted out the cover B is partially rotated until the holes *a* and *c* are brought opposite to each other. The T-shaped slot or recess *e* and pin or stop *f* act as guides to automatically fix these two positions—that is to say, when one end of the slot or recess *e* touches the pin or stop *f* the apertures are closed, and when the pin or stop is at the other end of the slot or recess the apertures are opened. By this slot or recess c the cover B is secured from dropping off in use.

The chief design of this invention is for storing and distributing carbon or other deodorizing and disinfecting material; but it may also be applied to coffee-canisters and the like.

I am aware that deodorizing and disinfecting powders and material are now stored in canisters with apertures or holes in the top, and when sent out by the venders the perforations are covered with gummed paper, which has to be removed before the contents can be distributed; but this construction is attended with the disadvantge that after its first use the canister is permanently unsealed, and the contents are liable to waste and to deterioration by exposure to the air and damp.

According to my invention the contents of the canisters can be practically resealed after each time of using, thereby protecting the contents from waste and damage. In the case of coffee, its aromatic property will be materially preserved by the use of my improved canisters, as the cover need not be removed with the liability of its not being immediately replaced.

Having now particularly described and ascertained the nature of my said invention and in what manner the same is to be performed, I declare that what I claim is—

A canister or box for containing and distributing granulated material, seed, and the like, consisting of a box-body having near its top edge one or more holes, $a$, and a rimmed cover for the same, having therein one or more holes, $c$, adapted, by turning the box or cover, to be brought opposite to or away from the hole or holes in the body, and a T-shaped slot, open at its bottom, made in the cover, and an inwardly-projecting pin in the body, serving to hold the cover and box together, all substantially as shown and described.

GEO. J. F. TATE.

Witnesses:
H. H. FRERE,
J. T. REDFERN.